(12) United States Patent
Arisawa

(10) Patent No.: US 6,567,394 B1
(45) Date of Patent: May 20, 2003

(54) NON-CONTACT IC CARD AND SYSTEM FOR PERFORMING DATA COMMUNICATION

(75) Inventor: Shigeru Arisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/244,010

(22) Filed: Feb. 4, 1999

(30) Foreign Application Priority Data

Feb. 10, 1998 (JP) ........................................... 10-028393

(51) Int. Cl.⁷ ................................................. H04J 1/00
(52) U.S. Cl. ...................... 370/343; 455/41; 455/74.1; 332/170
(58) Field of Search ........................ 455/74.1, 41, 46, 455/47, 48; 370/343, 342, 297; 235/380, 435, 492; 340/825.54, 928; 332/170

(56) References Cited

U.S. PATENT DOCUMENTS

| 4,546,241 A | 10/1985 | Walton ........................ 235/380 |
| 4,691,202 A | 9/1987 | Denne et al. .......... 340/825.54 |
| 5,068,521 A | 11/1991 | Yamaguchi ................. 235/492 |
| 5,517,194 A | 5/1996 | Carroll et al. ................. 342/50 |
| 6,036,100 A | * 3/2000 | Asami ......................... 235/492 |
| 6,081,718 A | * 6/2000 | Ando et al. .................. 455/447 |
| 6,126,077 A | * 10/2000 | Tanaka et al. ............... 235/492 |

FOREIGN PATENT DOCUMENTS

| EP | 0 309 201 A2 | 3/1989 | ............. G06K/7/08 |
| EP | 0 677 815 A2 | 3/1995 | ............. G06K/7/10 |
| WO | WO 97/00493 | 1/1997 | ............. G06K/7/10 |

OTHER PUBLICATIONS

U.S. patent application Ser. No. 08/872,619, filed Jun. 10, 1997.

* cited by examiner

*Primary Examiner*—Ed Urban
*Assistant Examiner*—Tilahun Gesesse
(74) *Attorney, Agent, or Firm*—Bell, Boyd & Lloyd LLC

(57) ABSTRACT

An IC card, an IC card processor, and an IC card system are simply arranged to perform full-duplex data exchange efficiently using a frequency band in such a manner that a transmission signal sent from the IC card processor is received by an antenna, the transmission signal is demodulated, and a response signal to be sent from the antenna is formed by modulating a main carrier having the same frequency as a main carrier of the transmission signal with a response data sequence in such a manner that a sideband of the response signal does not overlap a sideband of the transmission signal along the frequency axis.

17 Claims, 13 Drawing Sheets

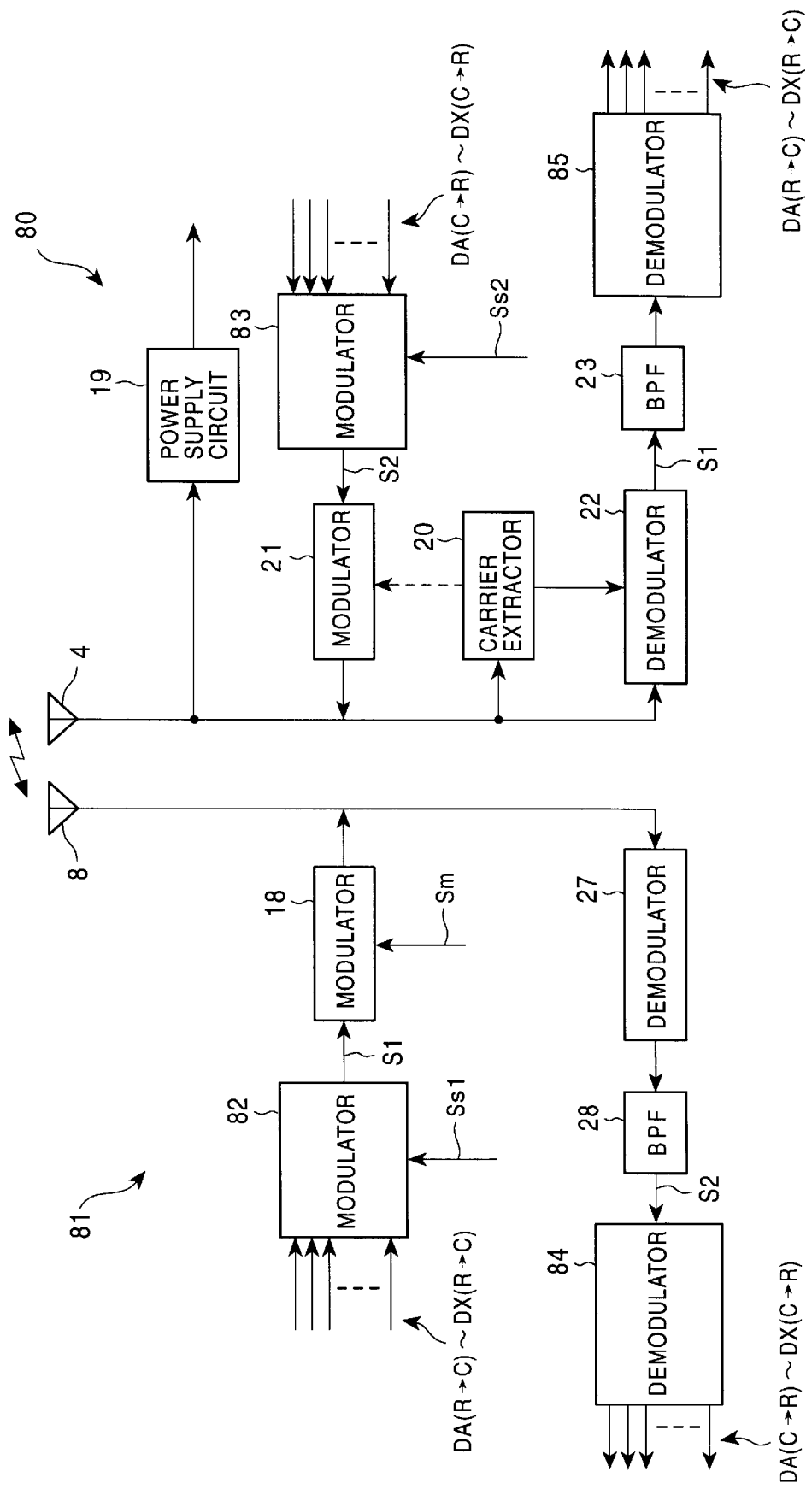

NON-CONTACT IC CARD AND SYSTEM FOR PERFORMING DATA COMMUNICATION

BACKGROUND OF THE INVENTION

1. Field of the Invention

The present invention relates to an IC card, an IC card processor, and an IC card system. The present invention can be applied to an IC card having various sorts of data input thereto or output therefrom in a non-contact manner, to an IC card processor which performs data communication with the IC card, and to an IC card system using the IC card.

2. Description of the Related Art

IC card systems using IC cards have been applied to ticket examination systems for use in transport facilities, room entry/exit control systems, etc. An IC card system of this kind has been proposed which is constituted of IC cards carried by users and a read/writer (i.e., IC card processor) for exchanging various sorts of data with each of the IC cards. Various sorts of data are transmitted and received between the IC card and the read/writer in a non-contact manner.

That is, in this kind of IC card system, the read/writer forms a transmission signal by modulating a carrier having a predetermined frequency with a desired data sequence, and sends out the transmission signal to the IC card via an antenna.

The IC card receives the transmission signal via an antenna and demodulates the transmission signal to extract the data sent from the read/writer. Further, the IC card sends out data such as personal information stored therein to the read/writer in response to the received data by modulating a predetermined carrier with the data to be transmitted.

The read/writer receives the data sent from the IC card, and opens or closes a door of a ticket examination machine or allows entry into or exit from a room.

Data exchange between the IC card and the read/writer may be executed based on a full-duplex method to reduce the time required for data exchange and to improve the handling of this kind of IC card system.

To enable data exchange based on a full-duplex method, the carrier frequency of the transmission signal to be sent out from the read/writer and the carrier frequency of the response signal to be sent out from the IC card are set to different frequencies.

However, the problem of a reduction in the efficiency of use of the frequency band is then encountered.

It is also necessary to efficiently transmit and receive the transmission signal and the response signal having different frequencies. Therefore, there is also a problem of the construction of the antennas, etc., becoming complicated.

In the case of a type of IC card operating by electric power of a received transmission signal, it is necessary to receive electric power by efficiently receiving the transmission signal and to efficiently transmit data by low electric power. If the efficiency of transmission and reception of the transmission signal and the reception signal cannot be sufficiently increased, the operation of the IC card is unstable.

SUMMARY OF THE INVENTION

In view of the above-described problems, an object of the present invention to provide an IC card, an IC card processor and an IC card system arranged so as to be simple in configuration as well as to be capable of data exchange based on a full-duplex method effectively utilizing a frequency band.

To achieve the above-described object, according to one aspect of the present invention, there is provided an IC card in which a response signal is formed by modulating a main carrier having the same frequency as a main carrier of a transmission signal with a response data sequence corresponding to a transmitted data sequence in such a manner that its sideband does not overlap a sideband of the transmission signal along the frequency axis.

According to another aspect of the present invention, there is provided an IC card processor in which a transmission signal is formed by modulating a main carrier having the same frequency as a main carrier of a response signal with a transmitted data sequence urging sending out of the response data sequence in such a manner that its sideband does not overlap a sideband of the response signal along the frequency axis. The transmission signal is sent out from a predetermined antenna.

There is also provided an IC card system in which an IC card forms a response signal by modulating a main carrier having the same frequency as a main carrier of a transmission signal with a response data sequence corresponding to a transmitted data sequence in such a manner that its sideband does not overlap a sideband of the transmission signal along the frequency axis, the IC card sending out the response signal from an antenna.

BRIEF DESCRIPTION OF THE DRAWINGS

FIG. 11 is a block diagram showing modulation and demodulation circuits in an IC card system which represents a seventh embodiment of the present invention;

DESCRIPTION OF THE PREFERRED EMBODIMENTS

Embodiments of the present invention will be described in detail with reference to the drawings.

(1) First Embodiment

Figure 2:
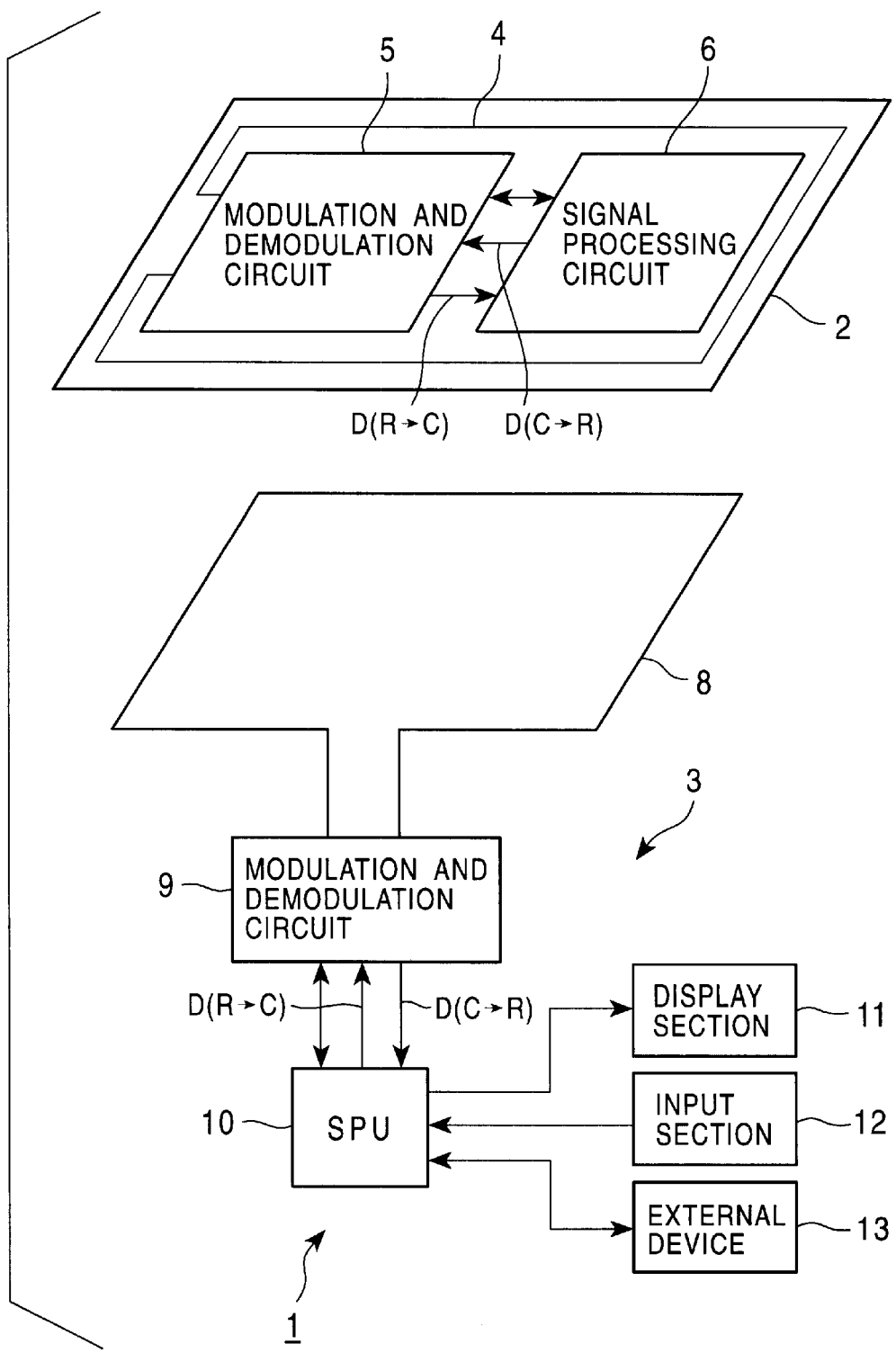
FIG. 2 is a block diagram showing the entire configuration of the IC card system shown in FIG. 1.

FIG. 2 is a block diagram showing an IC card system which represents a first embodiment of the present invention. This IC card system 1 is applied to, for example, a ticket examination system for use in transport facilities. In the IC card system 1, data is exchanged between an IC card 2 and a read/writer 3.

The IC card 2 is formed into the shape of a card by laminating a protective sheet and a base plate on which integrated circuits are mounted. The IC card 2 has a loop antenna 4 formed of a wiring pattern on the base plate. A modulation and demodulation circuit 5 and a signal processing circuit 6 are formed by the integrated circuits formed on the base plate.

The loop antenna 4 is coupled to a loop antenna 8 of the read/writer 3. The loop antenna 4 receives a transmission signal sent from the loop antenna 8 and radiates a response signal formed by the modulation and demodulation circuit 5.

The modulation and demodulation circuit 5 produces necessary electric power, a clock signal, etc., for the operation of the IC card 2 from a transmission signal received by the loop antenna 4. The modulation and demodulation circuit 5 operates by the electric power and the clock signal to demodulate the transmission signal to retrieve a data sequence sent from the read/writer 3 (hereinafter referred to as "transmitted data sequence") D (R→C). The modulation and demodulation circuit 5 outputs the data sequence to the signal processing circuit 6. By this transmitted data sequence, the modulation and demodulation circuit 5 is urged to transmit a response signal. The modulation and demodulation circuit 5 forms the response signal from a data sequence (hereinafter referred to as "response data sequence") D (C→R) input from the signal processing circuit 6 and radiates the response signal by driving the loop antenna 4 by the response signal.

The signal processing circuit 6 operates by the electric power and the clock signal generated by the modulation and demodulation circuit 5 to analyze the transmitted data sequence D (R→C) and outputs a response data sequence D (C→R) to the modulation and demodulation circuit 5 according to need.

In the read/writer 3, a modulation and demodulation circuit 9 forms a transmission signal from a transmitted data sequence D (R→C) input from an signal processing unit (SPU) 10 and drives the loop antenna 8 by this transmission signal. The modulation and demodulation circuit 9 processes a response signal received by the loop antenna 8 to retrieve a response data sequence D (C→R) sent from the IC card 2 and outputs this response data sequence D (C→R) to the SPU 10.

The SPU 10 is constituted of a calculation processing unit for executing a comparatively simple processing procedure. The SPU 10 sends to the modulation and demodulation circuit 9 a transmitted data sequence D (R→C) to be transmitted to the IC card 2. The SPU 10 also processes a response data sequence D (C→R) input from the modulation and demodulation circuit 9. During this processing, the SPU 10 displays the progress and results of processing by a display section 11 according to need. The SPU 10 also changes the operation by a command from an input section 12 and exchanges data for a processing procedure, etc., with an external device 13 according to need.

Figure 1:
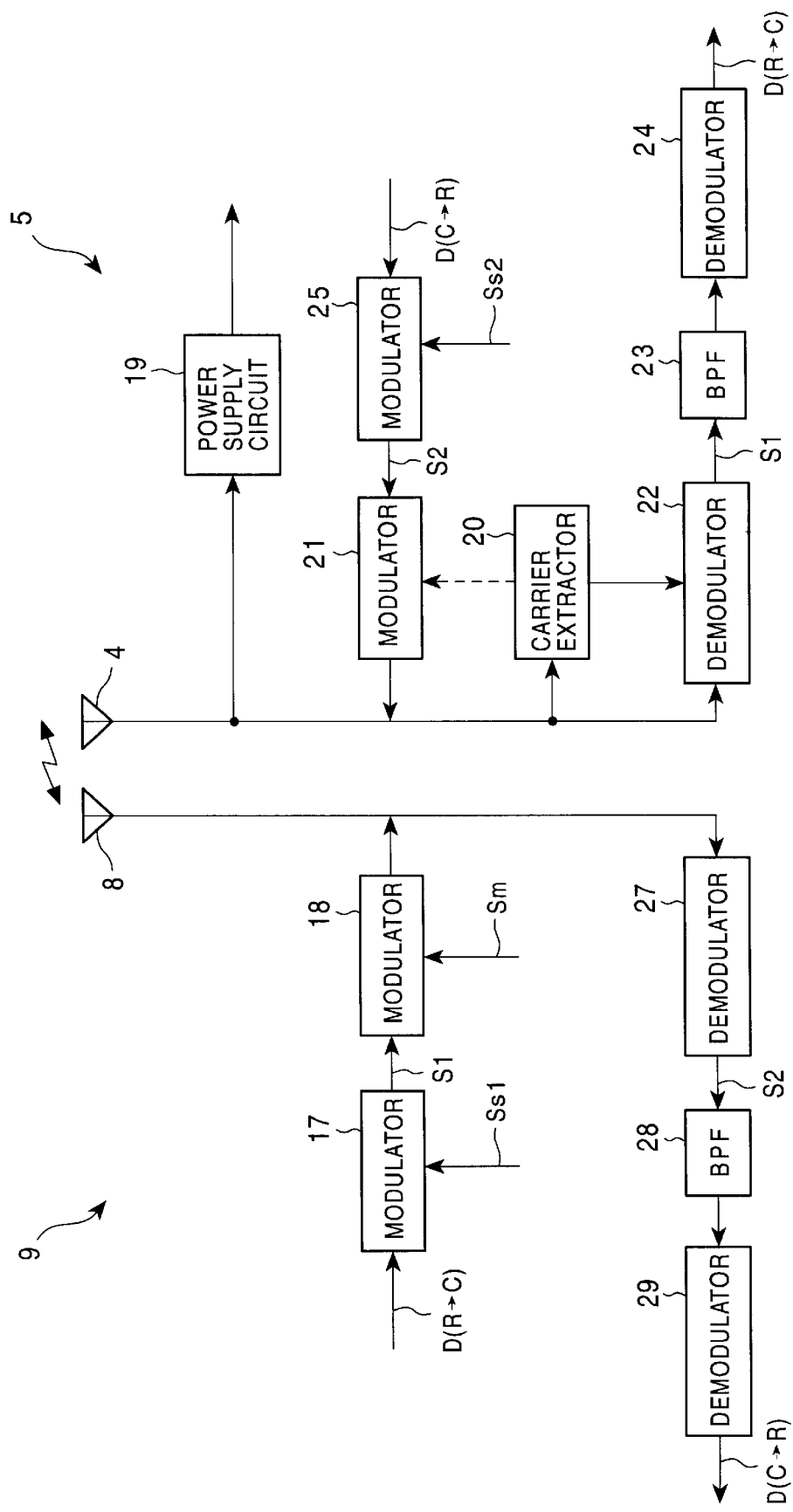
FIG. 1 is a block diagram showing modulation and demodulation circuits in an IC card system which represents a first embodiment of the present invention.

FIG. 1 is a block diagram showing the modulation and demodulation circuit 5 of the IC card 2 and the modulation and demodulation circuit 9 of the read/writer 3.

In the modulation and demodulation circuit 9, a modulator 17 performs binary phase shift keying (BPSK) modulation or differential phase shift keying (DPSK) modulation of a subcarrier Ss1 having a predetermined frequency F1 with a transmitted data sequence D (R→C) input from the SPU 10, and outputs the modulated signal. The transmitted data sequence D (R→C) is bit-coded in the nonreturn to zero (NRZ) manner and input at a rate of 106.2 kbps or 212.4 kbps from the SPU 10. As a method for this modulation, any of various modulation methods, such as amplitude shift keying (ASK), PSK, Gaussian-filtered minimum shift keying (GMSK), frequency shift keying (FSK), and pulse modulation (PM), can be used according to need.

A modulator 18 ASK-modulates a main carrier having a predetermined frequency Fm with an output signal S1 from the modulator 17 and drives the loop antenna 8. As a method for this modulation, any of various modulation methods, such as PSK, DPSK, GMSK, FSK, and PM, can be used according to need.

In this manner, the read/writer 3 forms a transmission signal by two-stage modulation with the transmitted data sequence D (R→C) and sends out the transmission signal from the loop antenna 8.

In the modulation and demodulation circuit 5 on the IC card 2 side, a power supply circuit 19 receives a transmission signal induced in the loop antenna 4 and rectifies this transmission signal to generate dc power. The power supply circuit 19 supplies this dc power to circuit blocks of the IC card 2. The modulation and demodulation circuit 5 and the signal processing circuit 6 are made to operate by electric power of the transmission signal.

A carrier extractor 20 receives the transmission signal from the loop antenna 4 and extracts a main carrier component of the transmission signal. The carrier extractor 20 outputs the main carrier component as an operating clock signal to a modulator 21 and to a demodulator 22. The carrier extractor 20 generates various reference clock signals based on the operating clock signal, and outputs the reference clock signals to the signal processing circuit 6 and to other components.

The demodulator 22 receives the transmission signal from the loop antenna 4 and processes and demodulates the transmission signal by using the operating clock signal output from the carrier extractor 20, thereby retrieving the output signal S1 from the modulator 17 superposed on the transmission signal.

A bandpass filter 23 performs band limitation of the output signal S1 to selectively output the signal component corresponding to the output signal S1 from the modulator 17.

A demodulator 24 demodulates an output signal from the bandpass filter 23 to retrieve the transmitted data sequence D (R→C) and outputs the transmitted data sequence D (R→C) to the signal processing circuit 6. Thus, the IC card 2 is arranged to receive the transmitted data sequence D (R→C) sent from the read/writer 3.

A modulator 25 receives, from the signal processing circuit 6, a response data sequence D (C→R) to be sent out to the read/writer 3, BPSK- or DPSK-modulates a subcarrier Ss2 having a predetermined frequency F2 (847.5 kHz) with the response data sequence D (C→R), and outputs the modulated signal. As a method for this modulation, any of various modulation methods, such as ASK, PSK, GMSK, FSK, and PM, can be used. The transmitted data sequence D (R→C) is bit-coded in the NRZ manner and input at a rate of 106.2 kbps or 212.4 kbps from the signal processing circuit 6.

The modulator 21 is constituted of a variable load circuit which is connected between two terminals of the loop antenna 4. The modulator 21 is impedance-variable according to the signal level of the output signal S2 from the modulator 25. The modulator 21 is thus arranged to change, according to the output signal S2 from the modulator 25, the power of a transmission signal induced in the loop antenna 4 and reradiated from the loop antenna 4.

The power reradiated from the loop antenna 4 consists mainly of the power of a main carrier Sm. Around the loop antenna 4, an electromagnetic field is formed by the main carrier Sm, the intensity of which changes according to the output signal S2 from the modulator 25. Accordingly, the modulator 21 forms a response signal carrying the response data sequence D (C→R) to the read/writer 3 by equivalently ASK-modulating the main carrier Sm with the output signal S1 from the modulator 21, and radiates the response signal from the loop antenna 4.

A demodulator 27 receives the response signal formed as described above and induced in the antenna 8, and demodulates the response signal to retrieve the output signal S2 from the modulator 25 superposed on the response signal.

A bandpass filter 28 performs band limitation of the output signal from the demodulator 25 to selectively output the signal component corresponding to the output signal S2 from the modulator 25.

A demodulator 29 demodulates the output signal from the bandpass filter 28 to retrieve the response data sequence D (C→R) and outputs the data sequence D (C→R) to the SPC 10. The read/writer 3 is thus arranged to receive the response data sequence D (C→R) sent from the IC card 2.

In the IC card 2 and the read/writer 3 each of which transmits or receives a data sequence as described above, the frequencies F1 and F2 of the subcarriers Ss1 and Ss2 are set to frequencies differing from each other by a predetermined frequency. The frequencies F1 and F2 and the depths of modulation in the modulators 17 and 25 are set to frequencies sufficiently spaced apart from each other and corresponding depths, such that, in the spectrum of the output signal S1 from the modulator 17 on the read/writer 3 side and the output signal S2 from the modulator 25 as seen along the frequency axis, the sidebands do not overlap each other, and such that, when the output signals S1 and S2 are superposed, each of the signal components of the output signal S1 and S2 can be respectively extracted by the bandpass filter 23 or 28 having a simple configuration.

The state in which the sidebands do not overlap each other along the frequency axis is, in effect, equivalent to, for example, a state in which, in high-order sidebands analyzed by being Bessel-expanded in frequency modulation or the like, components in the sidebands of one of two data sequences mixed in the bands of the sidebands of the other data sequence are suppressed to such a sufficiently low level that the other data sequence can be retrieved with sufficiently high reliability.

Figure 3:
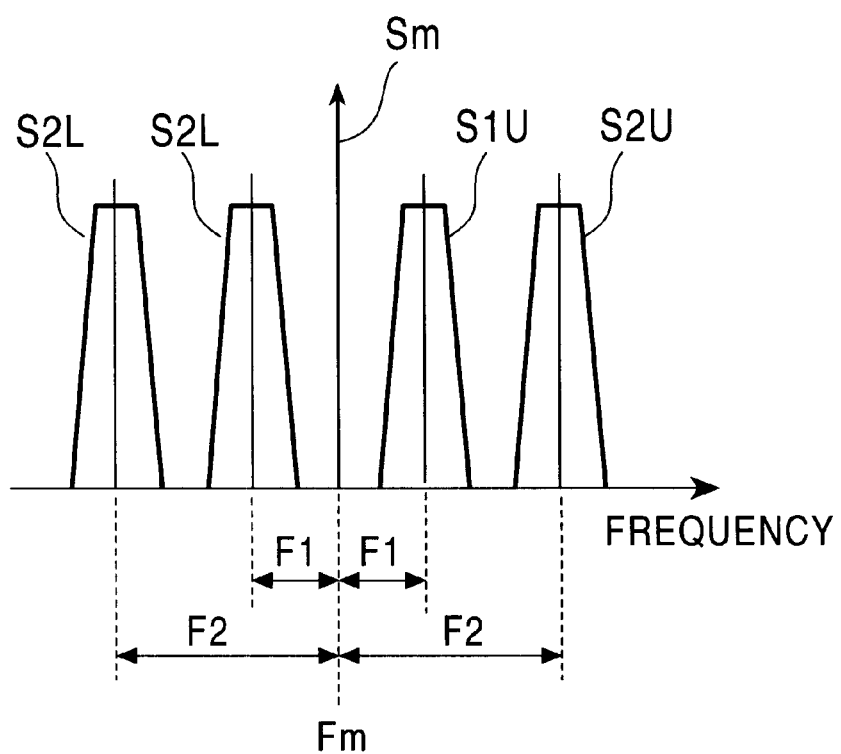
FIG. 3 is a characteristic curve diagram for explanation of the modulation and demodulation circuits shown in FIG. 1.

The frequency Fm of the main carrier Sm is set to a frequency of 13.56 MHz legally allowed with respect to this kind of IC card. The depth of modulation in the modulator 18 is set to about 10%, such that, as shown in FIG. 3, when electric fields formed by the loop antennas 4 and 8 are measured and the frequency spectrum thereof is observed, the power ratio of upper and lower waves S1U and S1L of the output signal S1 and upper and lower waves S2U and S2L of the output signal S2 to the total power is equal to or lower than 1%.

The modulator 18 is thus arranged to send out data sequence D (R→C) through the loop antenna 8 by setting the electric power of the sidebands to a level equal to or lower than a predetermined value while the main carrier Sm at a level equal to or higher than a predetermined value is sent out from the loop antenna 8.

In the IC card system 1 (FIGS. 1 and 2) arranged as described above, the subcarrier Ss1 having frequency F1 is modulated by the modulator 17 with the transmitted data sequence D (R→C) to be sent from the read/writer 3 to the IC card 2, and the main carrier Sm having frequency Fm is modulated with the signal modulated by the modulator 17 to be sent out from the loop antenna 8.

When the IC card 2 is brought close to the read/writer 3 operating in this manner, the transmission signal corresponding to the modulated main carrier Sm is induced in the loop antenna 4 of the IC card 2. A portion of this induced transmission signal is converted into electric power for the IC card 2 by the power supply circuit 19. The modulation and demodulation circuit 5 and the signal processing circuit 6 of the IC card 2 are driven by this electric power.

The transmission signal obtained by the loop antenna 4 is demodulated by the demodulator 22 to retrieve the output signal S1 from the modulator 17. This signal component undergoes band limitation in the bandpass filter 23 to be separated from other signal components, and the separated signal component is input to the subsequent demodulator 24. The transmitted data sequence D (R→C) is retrieved in the demodulator 24.

The transmitted data sequence D (R→C) is then analyzed in the signal processing circuit 6 to form the response data sequence D (C→R) to be sent to the read/writer 3. The response data sequence D (C→R) is input to the modulator 25. In the modulator 25, the subcarrier Ss2 having frequency F2 is modulated with the response data sequence D (C→R). In the modulator 21, the load impedance of the loop antenna 4 is changed according to the output signal S2 from the modulator 25. The response data sequence D (C→R) is thereby sent out as an amplitude-modulated signal on the main carrier Sm of the transmission signal.

The response data sequence D (C→R) is thereby transmitted from the IC card 2 to the read/writer 3. The response data sequence D (C→R) transmitted in the above-described manner is received by the read/writer 3 with the loop antenna 8 coupled to the loop antenna 4. The response signal forming the received signal is input to the demodulator 27 and is demodulated therein to retrieve the output signal S2 from the modulator 25. This signal component undergoes band limitation in the bandpass filter 28 to be separated from other signal components, and the separated signal component is input to the subsequent demodulator 29. The response data sequence D (C→R) is retrieved in the demodulator 28.

In transmission and reception of the response data sequence D (C→R) and the transmitted data sequence D (R→C) performed as described above, the frequencies F1 and F2 of the subcarriers Ss1 and Ss2 are set to different frequencies, and the frequencies F1 and F2 and the depths of modulation in the modulators 17 and 25 are set to such values that, in the spectrum of the output signal S1 from the modulator 17 on the read/writer 3 side and the output signal S2 from the modulator 25 as seen along the frequency axis, the sidebands do not overlap each other. Therefore, even in the case where the response data sequence D (C→R) and the transmitted data sequence D (R→C) are simultaneously transmitted from the IC card 2 and the read/writer 3, the response data sequence D (C→R) and the transmitted data sequence D (R→C) can be respectively received by the read/writer 3 and the IC card 2 without mutual disturbance.

That is, the demodulator 22 of the IC card 2 and the demodulator 27 of the read/writer 3 are supplied with the antenna outputs formed by respectively amplitude-modulating the main carrier Sm with the modulating signals (respectively formed of output signals S1 and S2) obtained by using the two data sequences D (C→R) and D (R→C). However, these output signals S1 and S2 are maintained so as not to overlap each other along the frequency axis. Therefore, the output signals S1 and S2 are respectively retrieved by the demodulators 22 and 27 without suffering from beat disturbance or the like and are respectively extracted by the bandpass filters 23 and 28. The extracted output signals S1 and S2 are respectively input to the demodulators 24 and 29. Thus, transmission and reception of the data sequences D (C→R) and D (R→C) can be performed in a full-duplex manner.

In this transmission and reception, in the IC card 2, it is possible to transmit response data sequence D (C→R) and to receive transmitted data sequence D (R→C) through one loop antenna 4 by using one main carrier Sm. In the read/writer 3, it is also possible to transmit transmitted data sequence D (R→C) and to receive response data sequence D (C→R) through one loop antenna 8 by using one main carrier Sm. Therefore, the configuration of each of the IC card 2 and the read/writer 3 can be simplified in comparison with the arrangement for transmission and reception of data sequences based on full duplexing using two carriers.

The shape of the loop antennas 4 and 8 can be selected so that the one main carrier can be efficiently transmitted and received, and desired data sequences can be transmitted and received by the simply arranged system. If the IC card 2 is supplied with electric power from a transmission signal, electric power for the IC card 2 can be efficiently supplied from the read/writer 3, thereby enabling the IC card system 1 to operate stably.

The main carrier Sm having frequency Fm of 13.56 MHz is modulated with output signals S1 and S2 obtained by respectively modulating subcarriers Ss1 and Ss2 with transmitted data sequence D (R→C) and response data sequence D (C→R). The main carrier Sm is modulated so that the power ratio of upper and lower waves S1U and S1L of the output signal S1 and upper and lower waves S2U and S2L of the output signal S2 to the total power, measured and observed in the frequency spectrum of electric fields formed by the loop antennas 4 and 8, is equal to or lower than 1%.

In this manner, electric power for stable exchange of data can be sent out from the loop antenna 8 at the frequency of 13.56 MHz legally allowed, but the field strength is effectively reduced in bands other than the band about the frequency of 13.56 MHz legally allowed, in which the increase in field strength is restricted by law.

In the transmission signal induced in the loop antenna 4 on the IC card 2 side, the amplitude variation component of the main carrier Sm appears continuously since the depth of modulation is set to 1 or less. Thus, the modulation of the main carrier Sm with the output signal S2 from the modulator 25 can be performed by changing the load impedance of the loop antenna 4 by the modulator 21.

In the above-described arrangement, data sequences D (R→C) and D (C→R) each of which is to be sent out from the read/writer 3 to the IC card 2 or from the IC card 2 to the read/writer 3 can be transmitted and received simultaneously by using the common main carrier Sm. This is achieved by performing a process in which the main carrier Sm is modulated with each of the modulating signals obtained by modulation of the subcarriers Ss1 and Ss2 of different frequencies with the data sequences in such a manner that the sidebands do not overlap each other along the frequency axis. Therefore, data exchange can be performed based on a full duplex method with a simply arranged system effectively utilizing a frequency band.

If the power supply circuit 19 is provided to drive the IC card 2 by electric power induced in the loop antenna 4, the IC card 2 can be efficiently supplied with power from the read/writer 3.

Full-duplex data exchange can be executed with the simply arranged IC card 2 by changing the load impedance of the loop antenna 4 so as to modulate the carrier Sm induced in the loop antenna 4.

The depth of modulation in the modulator 18 is set to about 10% to enable the main carrier Sm to be induced continuously in the loop antenna 4, thereby changing the load impedance of the loop antenna 4 so that the main carrier Sm induced in the loop antenna 4 is modulated reliably.

The depth of modulation in the modulator 18 is set to such a value that the power ratio of upper and lower waves S1U and S1L of the output signal S1 and upper and lower waves S2U and S2L of the output signal S2 to the total power, measured and observed in the frequency spectrum of electric fields formed by the loop antennas 4 and 8, is equal to or lower than 1%, thereby enabling the electric power in the sidebands to be set equal to or smaller than a predetermined value. Consequently, parasitic emissions can be reduced.

(2) Second Embodiment

Figure 4:
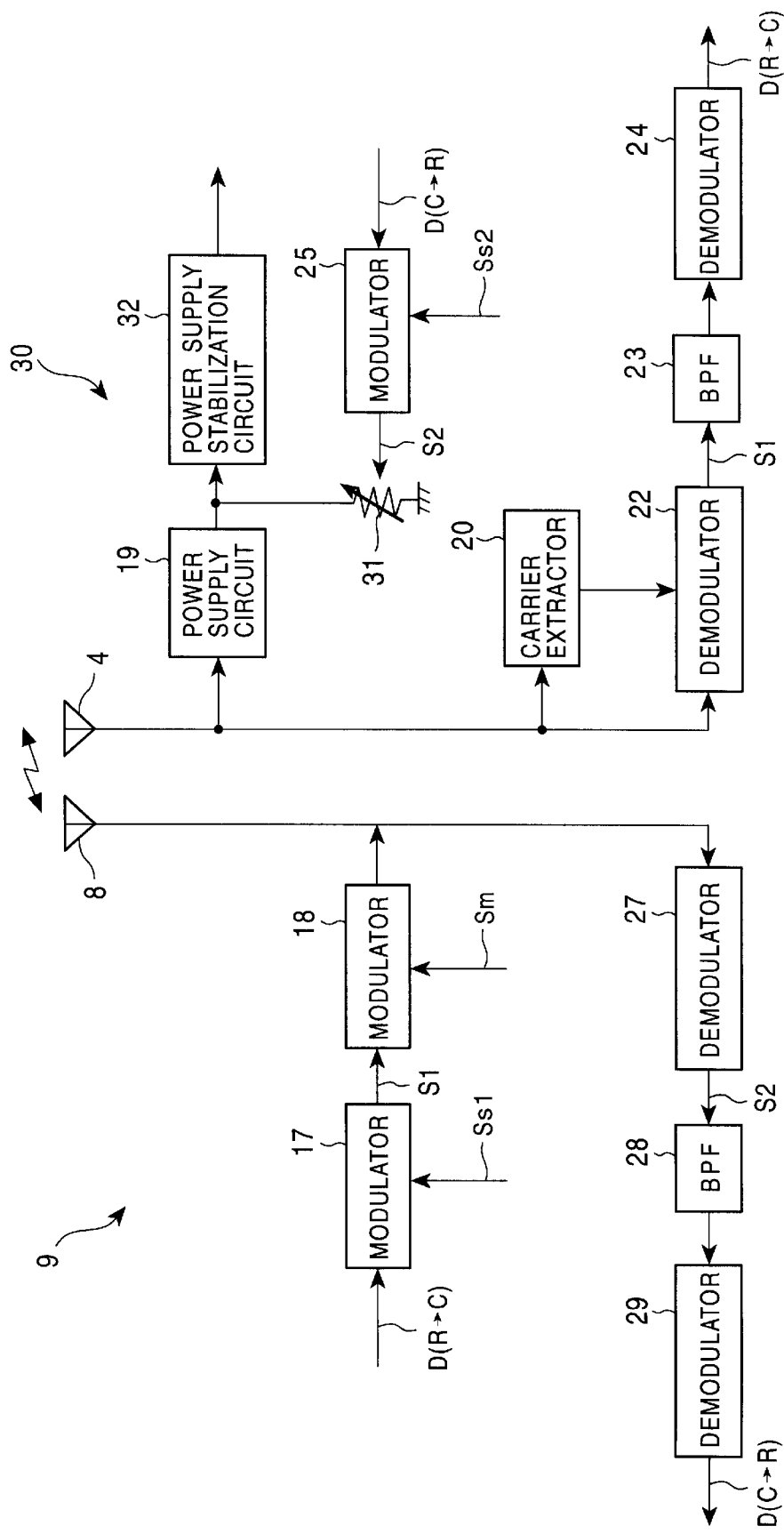
FIG. 4 is a block diagram showing modulation and demodulation circuits in an IC card system which represents a second embodiment of the present invention.

FIG. 4 is a block diagram showing a modulation and demodulation circuit 30 of an IC card used in an IC card system which represents a second embodiment of the present invention, and also showing the modulation and demodulation circuit 9 on the read/writer 3 side. In this embodiment, the load impedance of the loop antenna 4 is changed to send out response data sequence D (C→R) to the read/writer 3. At this time, the load on the power supply circuit 19 is changed to change the load impedance of the loop antenna 4. In the arrangement shown in FIG. 4, the same components as those described above with reference to FIG. 1 are indicated by the same reference numerals and the description for them will not be repeated.

A load circuit 31 is connected in a power supply line for the output from the power supply circuit 19, and has its resistance value changed according to the output signal S2 from the modulator 25. The load circuit 31 thereby changes the load on the power supply circuit 19 according to the output signal S2, thereby changing the input impedance of the power supply circuit 19 as seen from the loop antenna 4 according to the output signal S2. Thus, the load circuit 31 forms, in association with the power supply circuit 19, a final-stage modulation circuit for modulation with data sequence D (C→R) in two-stage modulation.

A power supply stabilization circuit 32 stabilizes the power supply voltage varied by the above-described change in the load and outputs the stabilized voltage.

According to the arrangement shown in FIG. 4, a final-stage modulation circuit for modulation in two-stage modulation of response data sequence D (C→R), which changes, for this modulation, the load impedance of the loop antenna 4 by changing the load on the power supply circuit 19, is formed. Thus, the same advantages as those of the first embodiment can be achieved by the simply arranged system.

(3) Third Embodiment

Figure 5:
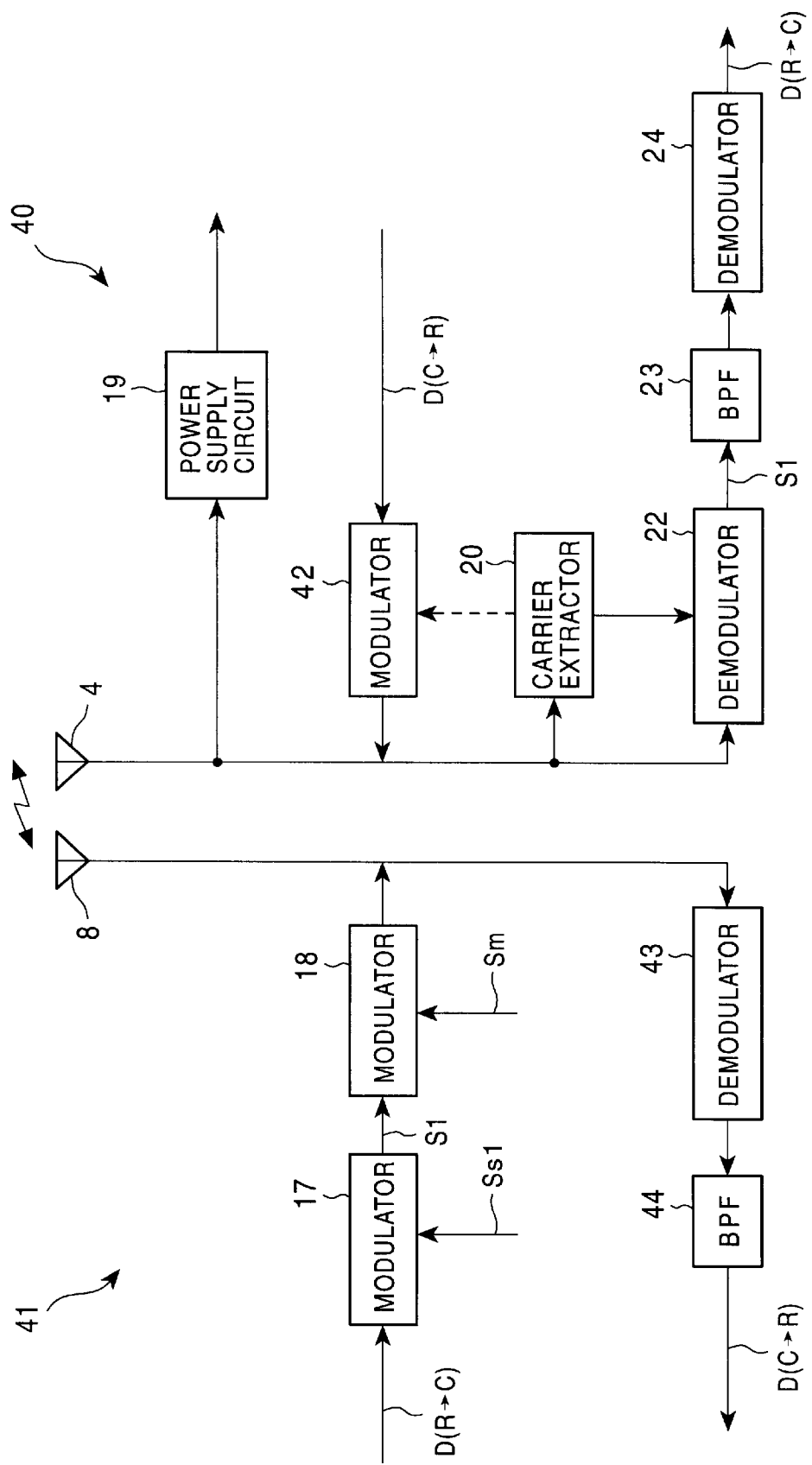
FIG. 5 is a block diagram showing modulation and demodulation circuits in an IC card system which represents a third embodiment of the present invention.
Figure 6:
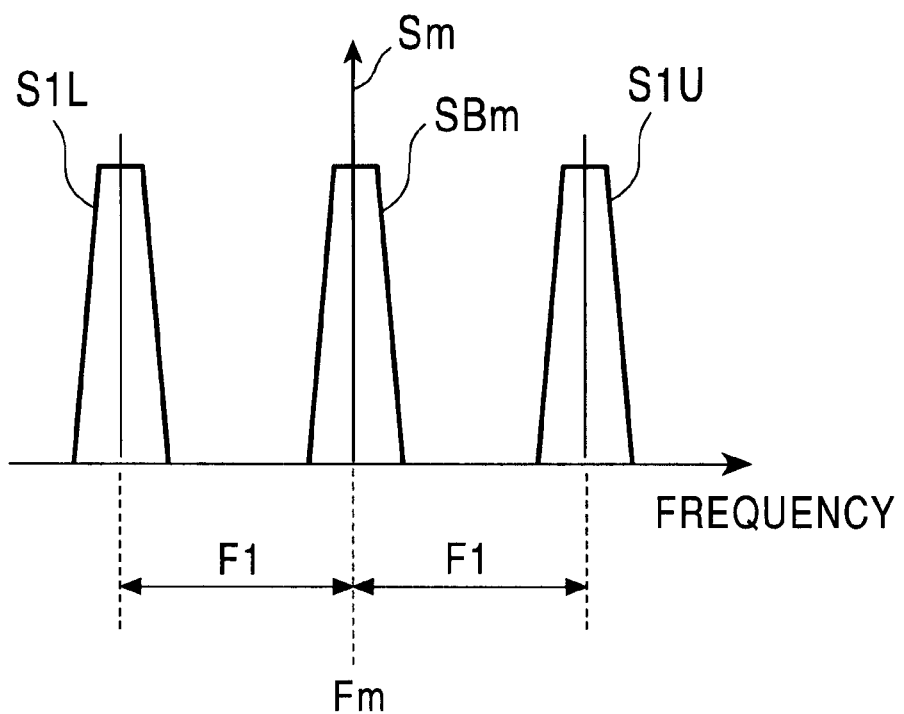
FIG. 6 is a characteristic curve diagram for explanation of the modulation and demodulation circuits shown in FIG. 5.

FIG. 5 is a block diagram showing modulation and demodulation circuits 40 and 41 of an IC card and a read/writer used in an IC card system which represents a third embodiment of the present invention. In the third embodiment, response data sequence D (C→R) to be transmitted from the IC card to the read/writer is transmitted by one-stage modulation. In the arrangement shown in FIG. 5, the same components as those described above with reference to FIG. 1 are indicated by the same reference numerals and the description for them will not be repeated.

In this embodiment, a modulator 42 amplitude-modulates main carrier Sm induced in the loop antenna 4 according to the logical level of response data sequence D (C→R) by changing the load impedance of the loop antenna according to response data sequence D (C→R).

Correspondingly, on the read/writer side, a demodulator 43 demodulates a response signal obtained from the loop antenna 8 to retrieve response data sequence D (C→R), and a subsequent low-pass filter (LPF) 44 performs band limitation of this response data sequence D (C→R) and outputs the passed response data sequence D (C→R).

In this embodiment, setting of the modulators 17, 18, and 42 and setting of subcarrier Ss1 are performed in such a manner that a sideband component SBm corresponding to response data sequence D (C→R) and sideband components S1U and S1L corresponding to transmitted data sequence D (R→C) do not overlap each other along the frequency axis. The power ratio of these sideband components S1U, S1L, and SBm, and the main carrier component is set in the same manner as in the first embodiment.

According to the arrangement shown in FIG. 5, sideband components S1U and S1L are set so as not to overlap each other along the frequency axis even if two-stage modulation is not performed for response data sequence D (C→R) sent out from the IC card side. Thus, the same advantages as those of the first embodiment can be achieved by the simply arranged system.

(4) Fourth Embodiment

Figure 7:
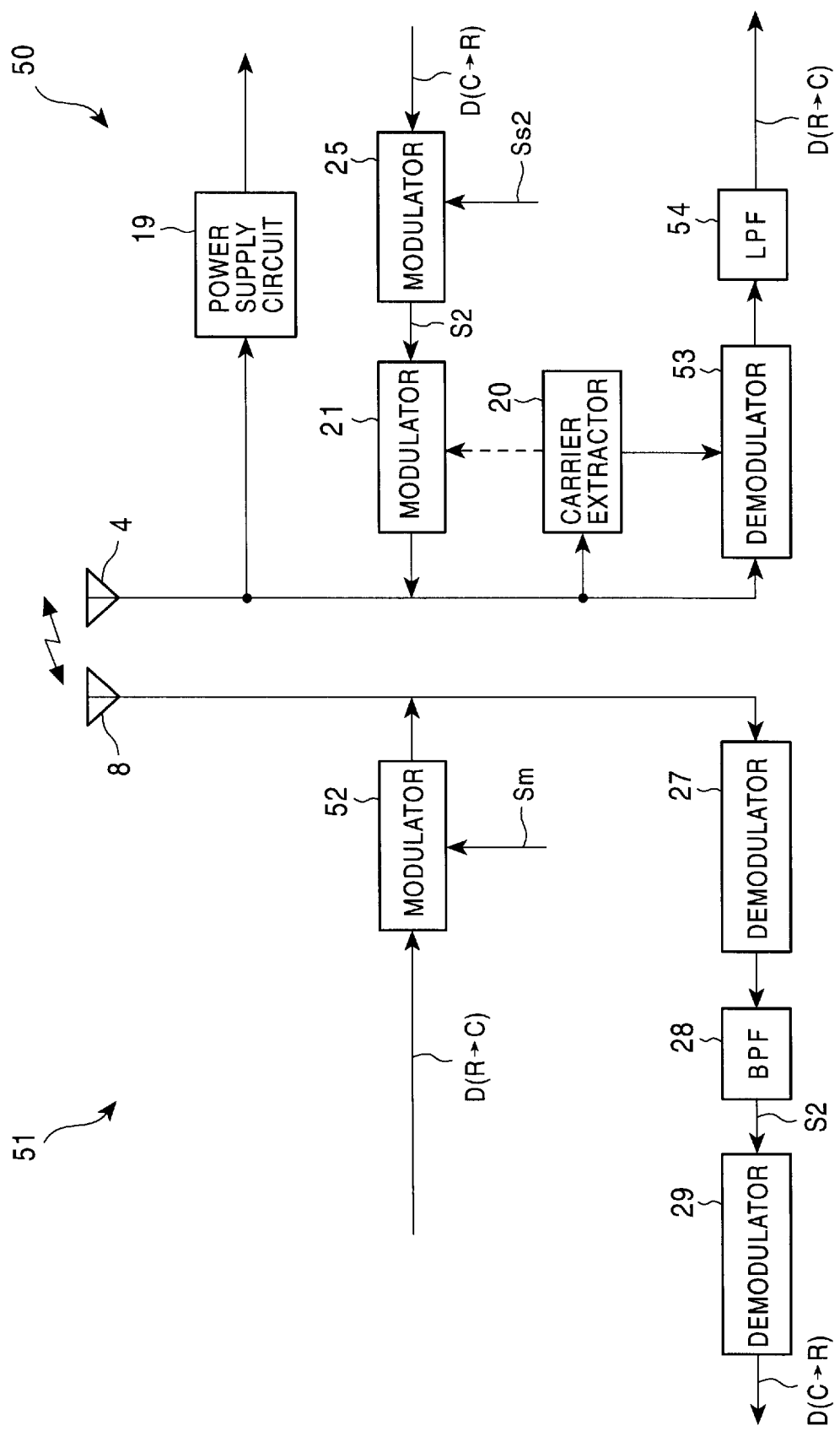
FIG. 7 is a block diagram showing modulation and demodulation circuits in an IC card system which represents a fourth embodiment of the present invention.

FIG. 7 is a block diagram showing modulation and demodulation circuits 50 and 51 of an IC card and a read/writer used in an IC card system which represents a fourth embodiment of the present invention. In the fourth embodiment, transmitted data sequence D (R→C) to be transmitted from the read/writer to the IC card is transmitted by one-stage modulation. In the arrangement shown in FIG. 7, the same components as those described above with reference to FIG. 1 are indicated by the same reference numerals and the description for them will not be repeated.

In this embodiment, a modulator 52 amplitude-modulates main carrier Sm with transmitted data sequence D (R→C). The modulator 52 performs this amplitude modulation to a depth of modulation of about 10% to form a transmission signal such that the power ratio of main carrier Sm to the total transmitted power is 99% or higher, and such that main carrier Sm does not intermit.

On the other hand, in the modulation and demodulation circuit 50 on the IC card side, a demodulator 53 demodulates a transmission signal obtained from the loop antenna 4 to retrieve transmitted data sequence D (R→C), and a subsequent low-pass filter (LPF) 54 performs band limitation of this transmitted data sequence D (R→C) and outputs the passed transmitted data sequence D (R→C).

In this embodiment, setting of the modulators 21, 25, and 52 and setting of subcarrier Ss2 are performed in such a manner that sideband components corresponding to response data sequence D (C→R) and a sideband component corresponding to transmitted data sequence D (R→C) do not overlap each other along the frequency axis.

According to the arrangement shown in FIG. 7, the sideband components are set so as not to overlap each other along the frequency axis even if two-stage modulation is not performed for transmitted data sequence D (R→C) sent out from the IC card processor side. Thus, the same advantages as those of the first embodiment can be achieved by the simply arranged system.

(5) Fifth Embodiment

Figure 8:
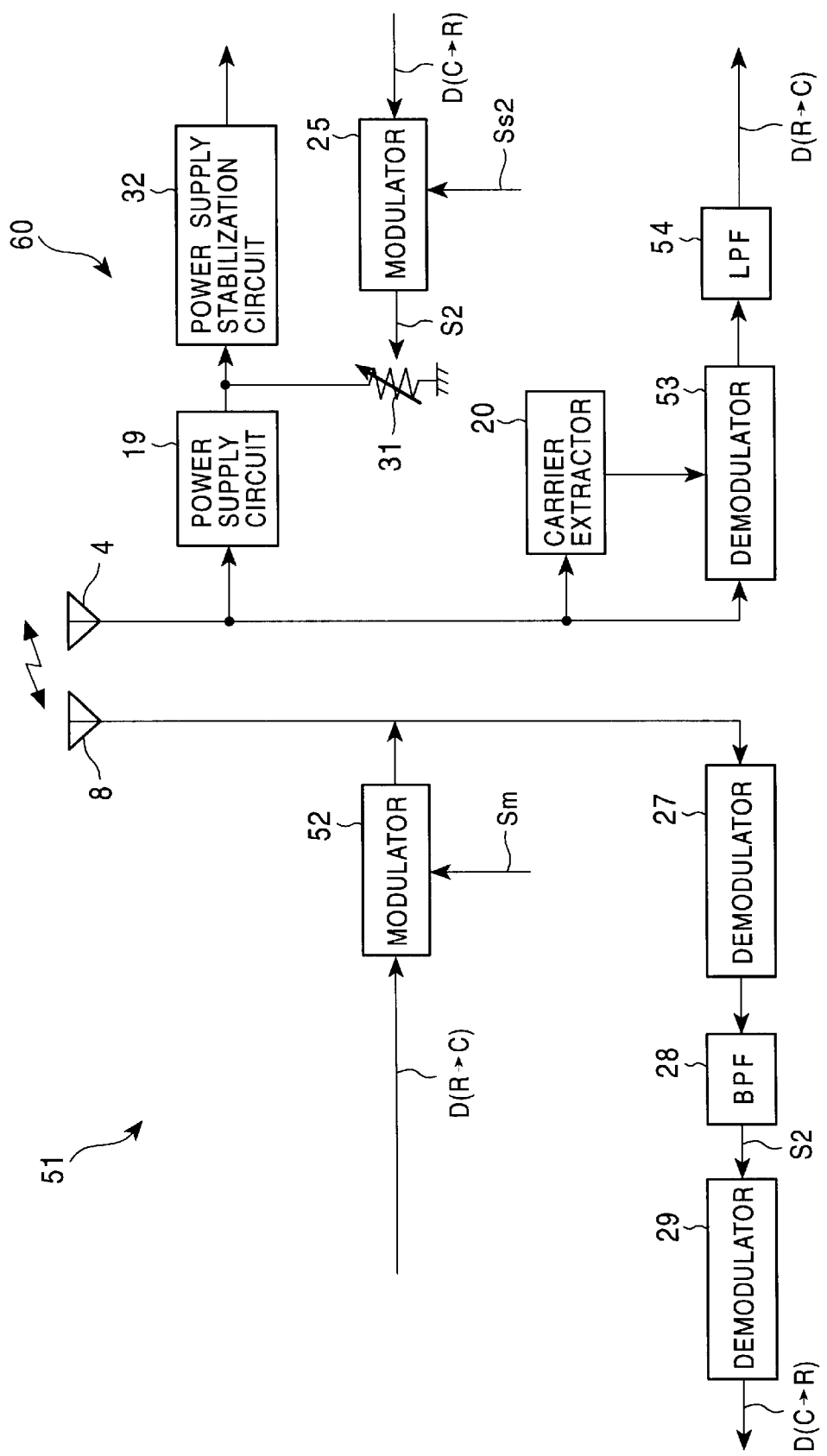
FIG. 8 is a block diagram showing modulation and demodulation circuits in an IC card system which represents a fifth embodiment of the present invention.

FIG. 8 is a block diagram showing modulation and demodulation circuits 60 and 51 of an IC card and a read/writer used in an IC card system which represents a fifth embodiment of the present invention. In the arrangement shown in FIG. 8, the same components as those described above with reference to FIGS. 4 and 7 are indicated by the same reference numerals and the description for them will not be repeated.

In this embodiment, the modulation and demodulation circuit 51 forms a transmission signal by one-stage modulation with the modulator 52. On the other hand, the modulation and demodulation circuit 60 performs demodulation with a demodulator 53 to extract transmitted data sequence D (R→C).

On the IC card side, modulation with response data sequence D (C→R) is performed by changing the power supply load with the modulator 25 and the load circuit 31.

According to the arrangement shown in FIG. 8, the same advantages as those of the first embodiment can also be achieved by sending out transmitted data sequence D (R→C) by one-stage modulation and by changing the power supply load for modulation with response data sequence D (C→R).

(6) Sixth Embodiment

Figure 9:
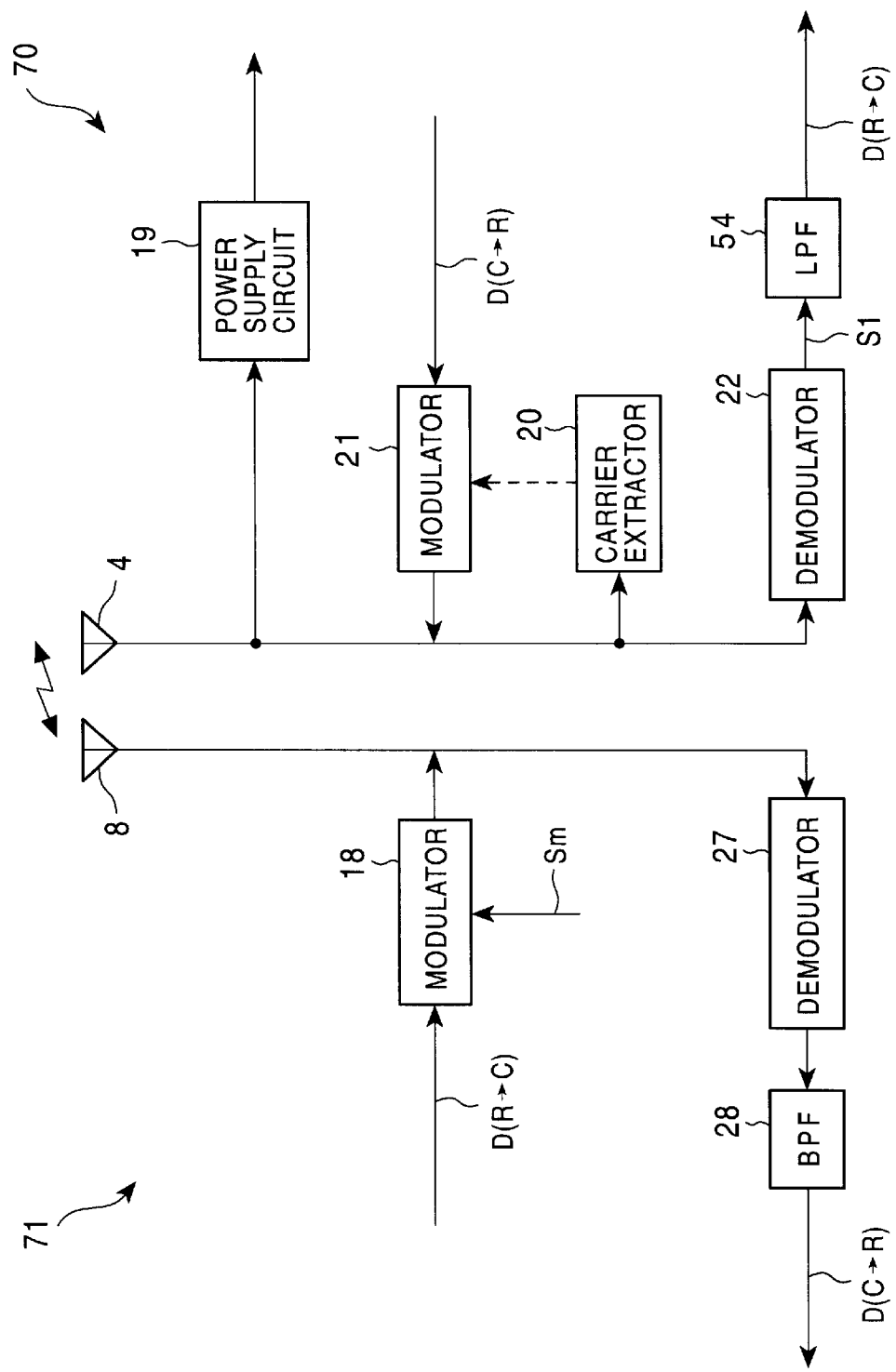
FIG. 9 is a block diagram showing modulation and demodulation circuits in an IC card system which represents a sixth embodiment of the present invention.

FIG. 9 is a block diagram showing modulation and demodulation circuits 70 and 71 of an IC card and a read/writer used in an IC card system which represents a sixth embodiment of the present invention. In the arrangement shown in FIG. 9, the same components as those described above with reference to FIGS. 1 and 7 are indicated by the same reference numerals and the description for them will not be repeated.

In this embodiment, a transmission signal and a response signal are formed by one-stage modulation with transmitted data sequence D1 (R→C) and response data sequence D1 (C→R) in which spectrum components are distributed about a frequency corresponding to a transfer rate, and in which dc components are sufficiently suppressed, in such a manner that the sidebands do not overlap each other.

Figure 10A:
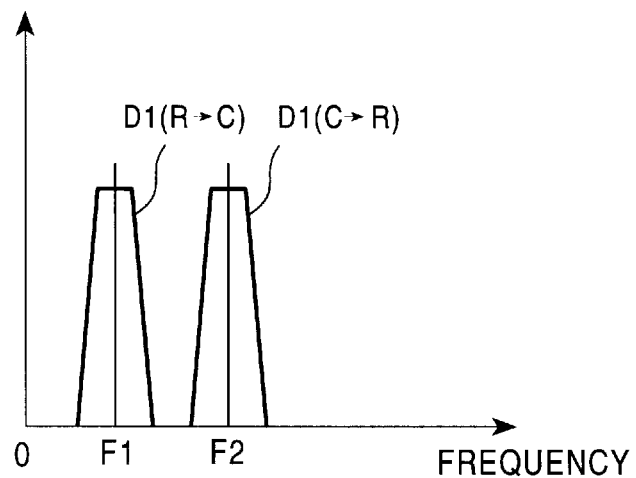
FIGS. 10A and 10B are characteristic curve diagrams for explanation of the modulation and demodulation circuits shown in FIG. 9.

That is, as shown in FIG. 10A, transmitted data sequence D1 (R→C) is formed by, for example, a Manchester code such that spectrum components are distributed about frequency F1 and dc components are sufficiently suppressed. Also, response data sequence D1 (C→R) is formed by, for example, a Manchester code such that spectrum components are distributed about frequency F2. The transfer rates of the transmitted data sequence D1 (R→C) and the response data sequence D1 (C→R) are set to such values that their basebands do not overlap each other.

Figure 10B:
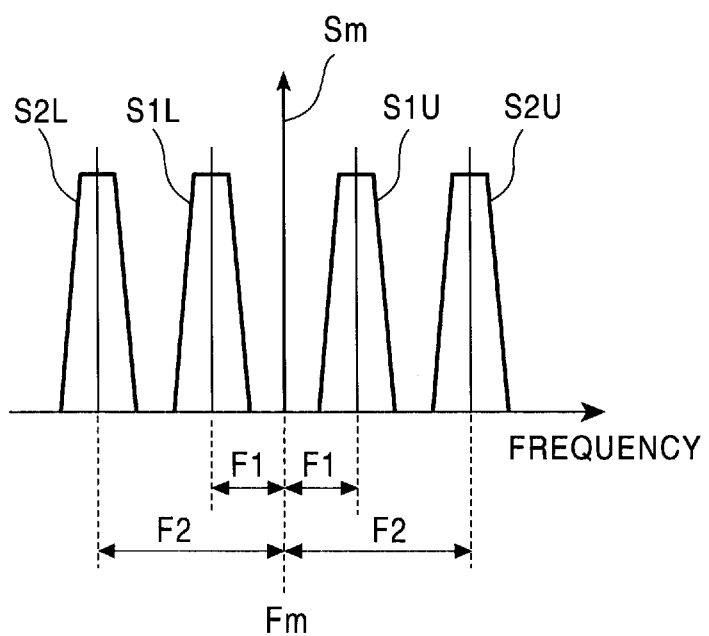

In this embodiment, the modulators 18 and 21 respectively form a transmission signal and a response signal by using these data sequences in such a manner that sidebands S1U to S2L of transmitted data sequence D1 (R→C) and response data sequence D1 (C→R) do not overlap each other, as shown in FIG. 10B.

According to the arrangement shown in FIG. 9, a transmission signal and a response signal are formed by one-stage modulation with transmitted data sequence D1 (R→C) and response data sequence D1 (C→R) in which spectrum components are distributed about a frequency corresponding to a transfer rate, and in which dc components are sufficiently suppressed, in such a manner that the sidebands do not overlap each other. Thus, the same advantages as those of the first embodiment can be achieved by the much simpler arrangement.

(7) Seventh Embodiment

FIG. 11 is a block diagram showing modulation and demodulation circuits 80 and 81 of an IC card and a read/writer used in an IC card system which represents a seventh embodiment of the present invention. In the arrangement shown in FIG. 11, the same components as those described above with reference to FIG. 1 are indicated by the same reference numerals and the description for them will not be repeated.

In this embodiment, a plurality of transmitted data sequences DA (R→C) to DX (R→C) and a plurality of response data sequences DA (C→R) to DX (C→R) are each transmitted and received by being multiplexed. That is, in the modulation and demodulation circuit 81, a modulator 82 performs multiphase PSK modulation of subcarrier Ss1 having frequency F1 with a plurality of transmitted data sequences DA (R→C) to DX (R→C) and outputs the modulated signal.

In the modulation and demodulation circuit 80 on the IC card side, a modulator 83 performs multiphase PSK modulation of subcarrier Ss2 having frequency F2 with a plurality of response data sequences DA (C→R) to DX (C→R) and outputs the modulated signal. As a multiplexing method, quadrature amplitude modulation (QAM) or the like may by used instead of multiphase PSK modulation.

Correspondingly, a demodulator 84 of the modulation and demodulation circuit 81 demodulates output signal S2 from the bandpass filter 28 to extract response data sequences DA (C→R) to DX (C→R). Also, a demodulator 85 of the modulation and demodulation circuit 80 on the IC card side demodulates output signal S1 from the bandpass filter 23 to extract transmitted data sequences DA (R→C) to DX (R→C).

In this embodiment, the transmission signal and the response signal are formed by these modulation and demodulation processings so that the sidebands do not overlap each other, as described above with reference to FIG. 3, and so that the power of main carrier Sm is equal to or larger than a predetermined value.

According to the arrangement shown in FIG. 11, the same advantages as those of the first embodiment can be achieved even in the case of multiplexing and transmitting a plurality of data sequences.

(8) Eighth Embodiment

Figure 12:
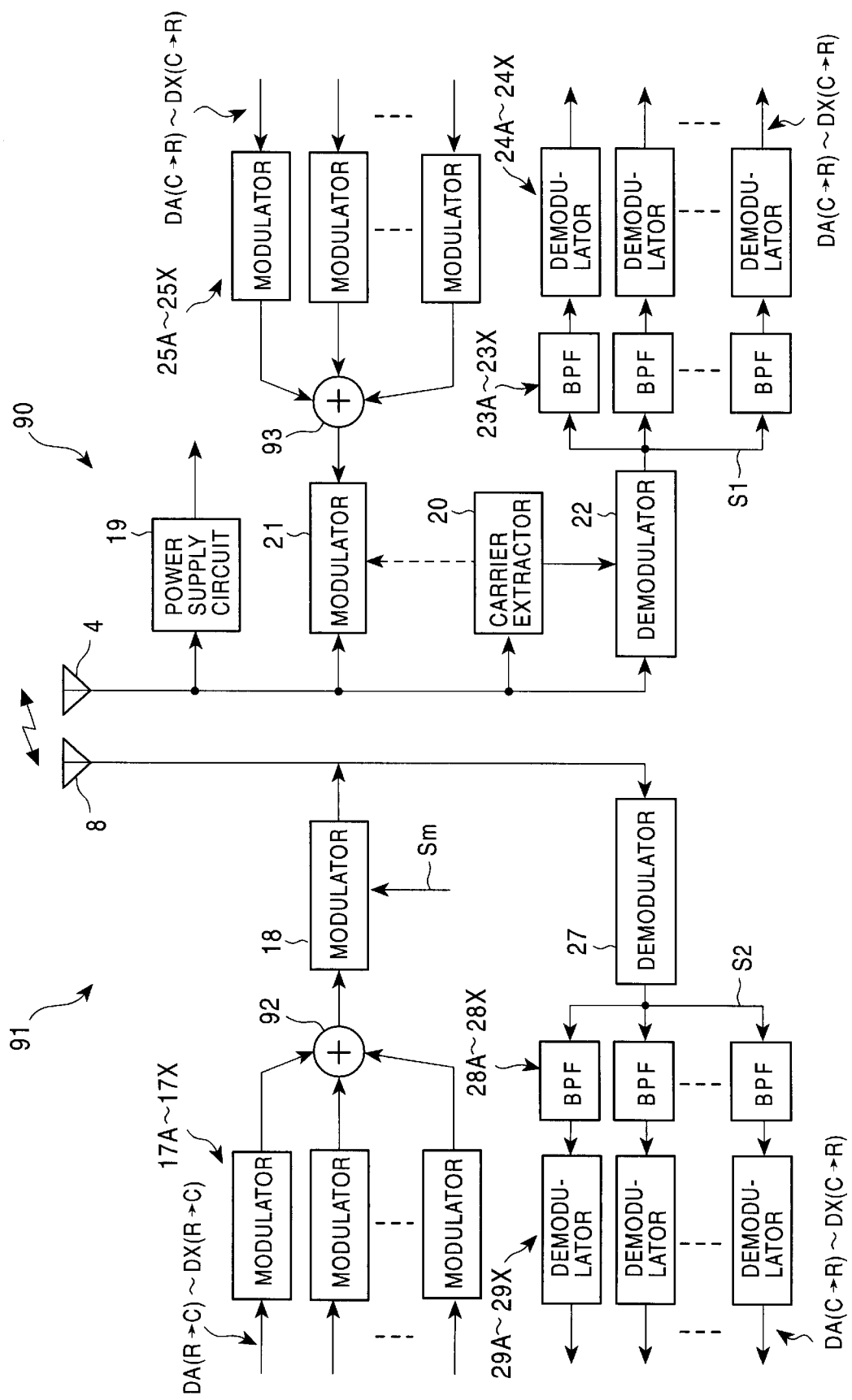
FIG. 12 is a block diagram showing modulation and demodulation circuits in an IC card system which represents an eighth embodiment of the present invention.

FIG. 12 is a block diagram showing modulation and demodulation circuits 90 and 91 of an IC card and a read/writer used in an IC card system which represents an eighth embodiment of the present invention. In the arrangement shown in FIG. 12, the same components as those of the above-described embodiments are indicated by the same reference numerals and the description for them will not be repeated.

Figure 13A:
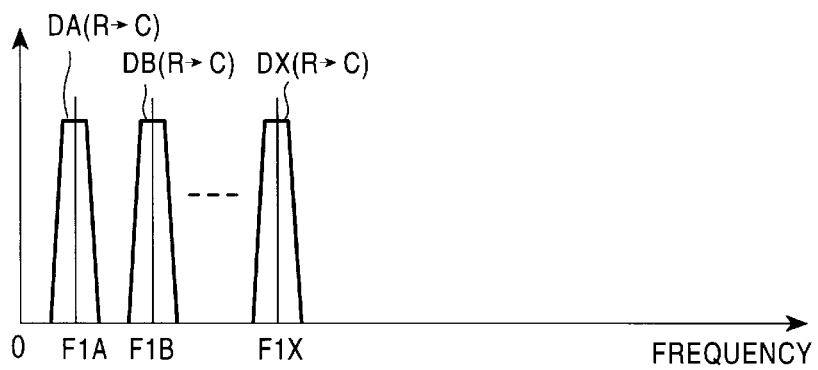
FIGS. 13A, 13B, and 13C are characteristic curve diagrams for explanation of the modulation and demodulation circuits shown in FIG. 12.

In this embodiment, a plurality of transmitted data sequences DA (R→C) to DX (R→C) and a plurality of response data sequences DA (C→R) to DX (C→R) are each transmitted and received by being multiplexed. That is, in the modulation and demodulation circuit 91, modulators 17A to 17X modulate subcarriers having predetermined frequencies F1A to F1X with transmitted data sequences DA (R→C) to DX (R→C). A summing circuit 92 adds outputs from the modulators 17A to 17X together. In the modulation and demodulation circuit 92, the depth of modulation and the frequencies F1A to F1X of the subcarriers are set to such values that the sidebands of the output signals do not overlap each other, as shown in FIG. 13A. Thus, a transmission signal is formed by frequency-multiplexing the plurality of transmitted data sequences DA (R→C) to DX (R→C).

Figure 13B:
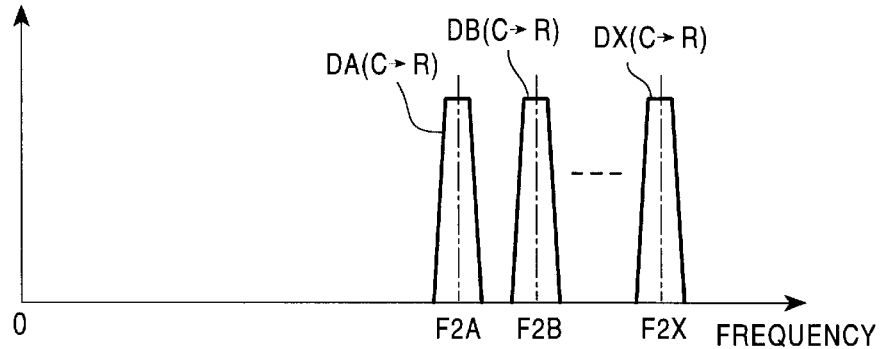
Figure 13C:
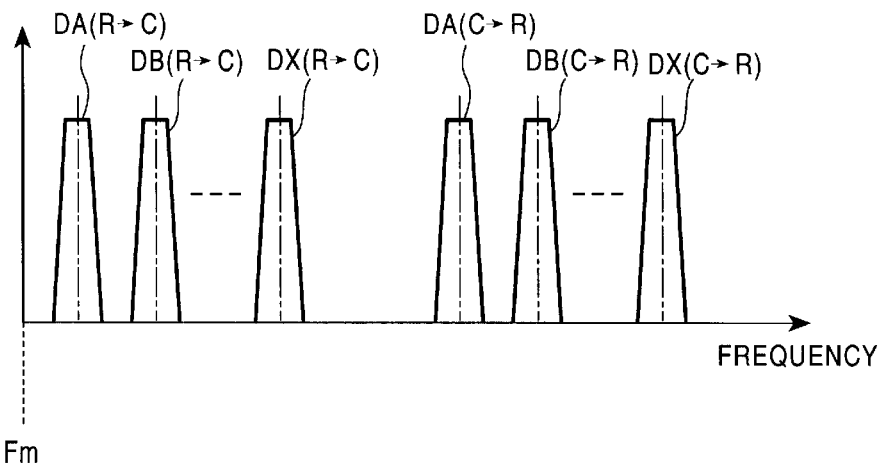

In the modulation and demodulation circuit 90, modulators 25A to 25X modulate subcarriers having predetermined frequencies F2A to F2X with response data sequences DA (C→R) to DX (C→R). A summing circuit 93 adds outputs of the modulators 25A to 25X together. In the modulation and demodulation circuit 90, the depth of modulation and the frequencies F2A to F2X of the subcarriers are set to such values that the sidebands of the output signals do not overlap each other, and that the sidebands of the output signals and the sidebands of the frequency-multiplexed signal on the IC card processor side do not overlap each other, as shown in FIGS. 13B and 13C. Thus, a response signal is formed by frequency-multiplexing the plurality of response data sequences DA (C→R) to DX (C→R).

Correspondingly, the modulation and demodulation circuit 91 performs band limitation about center frequencies F2A to F2X of output signals from the demodulator 27 in bandpass filters 28A to 28X, thereby reproducing the output signals from the modulators 25A to 25X. Demodulators 29A to 29X demodulate output signals from the bandpass filters 28A to 28X to extract response data sequences DA (C→R) to DX (C→R).

The modulation and demodulation circuit 90 on the IC card side performs band limitation about center frequencies F1A to F1X of output signals from the demodulator 22 in bandpass filters 23A to 23X, thereby reproducing the output signals from the modulators 17A to 17X. Demodulators 24A to 24X demodulate output signals from the bandpass filters 23A to 23X to extract transmitted data sequences DA (R→C) to DX (R→C).

In this embodiment, the transmission signal and the response signal are formed by these modulation and demodulation processings so that the sidebands do not overlap each other, as described above with reference to FIG. 3, and so that the power of main carrier Sm is equal to or larger than a predetermined value.

According to the arrangement shown in FIG. 12, the same advantages as those of the first embodiment can be achieved even in the case of multiplexing and transmitting a plurality of data sequences.

(9) Other Embodiments

The embodiments have been described with respect to the case where a transmission signal is formed by modulation to a depth of 10%, but the present invention is not limited to this. If the power of the sidebands is not restricted by law, or in a like situation, the transmission signal may be formed by a depth of modulation smaller than 1 to achieve the same advantages as the above-described embodiments.

The embodiments have been described with respect to the case where loop antennas are used, but the present invention is not limited to this. A dipole antenna or any of other antennas having various shapes may alternatively be used.

The embodiments have been described with respect to the case where the frequency of main carrier Sm is set to 13.56 MHz, but the present invention is not limited to this, and can find various applications in which the main carrier frequencies is set to a frequency in a microwave band or any other frequencies.

The embodiments have been described with respect to the case where the IC card is operated by electric power of a transmission signal, but the present invention is not limited to this, and can be find various applications in which a battery or any other means is used to operate the IC card.

The embodiments have been described with respect to the case where an antenna is used in common for transmission and reception of data sequences on the IC card processor side, but the present invention is not limited to this. A complicated configuration may be allowed on the IC card processor side in comparison with the IC card configuration, and antennas respectively dedicated to transmission and reception may be provided on the IC card processor side.

The embodiments have been described with respect to the case where a response signal is formed by changing the load impedance of the antenna in the IC card, but the present invention is not limited to this. The arrangement of the modulator and the demodulator may be such that a reference signal having the same frequency as the main carrier and phase-synchronized with the main carrier is formed by a carrier extraction circuit having a PLL configuration, and a response signal is formed by modulating the reference signal, as indicated by the broken line in the diagram showing the configuration of each modulation and demodulation circuit.

According to the present invention, as described above, data sequences are transmitted by using main carriers having the same frequency on the IC card side and the IC card processor side and by performing modulation of the main carriers with the data sequences in such a manner that the sidebands do not overlap along the frequency axis. Therefore, data exchange can be performed based on a full duplex method with a simply arranged system and by effectively utilizing a frequency band.

What is claimed is:

1. An IC card which transmits and receives desired data sequences in non-contact transmission between itself and a predetermined processor, said IC card comprising:
   an antenna for receiving a transmission signal from the processor;
   a demodulation circuit for retrieving a transmitted data sequence sent from the processor by demodulating the transmission signal received by said antenna; and
   a modulation circuit for forming a response signal by modulating a main carrier having the same frequency as a main carrier of the transmission signal with a response data sequence corresponding to the transmitted data sequence in such a manner that a sideband of the response signal does not overlap a sideband of the transmission signal along the frequency axis, said modulation circuit sending out the response signal from said antenna.

2. An IC card according to claim 1, wherein said demodulation circuit comprises:
   a first demodulator for demodulating the transmission signal to obtain a demodulated signal; and
   a second demodulator for demodulating the demodulated signal to retrieve the transmitted data sequence.

3. An IC card according to claim 1, wherein said modulation circuit forms the response signal by modulating a subcarrier having a predetermined frequency with the response data sequence, and forms the response signal by modulating the main carrier with the modulated subcarrier.

4. An IC card according to claim 1, wherein the response data sequence is formed of a plurality of data sequences, and
   wherein said modulation circuit multiplexes the plurality of data sequences and thereafter forms the response signal.

5. An IC card according to claim 4, wherein said modulation circuit forms the response signal by frequency-multiplexing the plurality of data sequences.

6. An IC card according to claim 1, wherein the response data sequence is coded by a coding method of suppressing a lower band.

7. An IC card according to claim 1, wherein said modulation circuit sends out the response signal from said antenna by changing the load impedance of said antenna.

8. An IC card according to claim 1, wherein said demodulation circuit and said modulation circuit are operated by electric power of the transmission signal.

9. An IC card processor which transmits and receives desired data sequences in non-contact transmission between itself and an IC card, said IC card processor comprising:
   a demodulation circuit for retrieving a response data sequence sent from the IC card by demodulating a response signal sent from the IC card by wireless communication; and
   a modulation circuit for forming a transmission signal by modulating a main carrier having the same frequency as a main carrier of the response signal with a transmitted data sequence urging sending out of the response data sequence in such a manner that a sideband does not overlap a sideband of the response signal along the frequency axis, said modulation circuit sending out the transmission signal from a predetermined antenna.

10. An IC card processor according to claim 9, wherein said demodulation circuit comprises:
    a first demodulator for demodulating the response signal to obtain a demodulated signal; and
    a second demodulator for demodulating the demodulated signal to retrieve the response data sequence.

11. An IC card processor according to claim 9, wherein said modulation circuit forms the transmission signal by modulating a subcarrier having a predetermined frequency with the transmitted data sequence, and forms the transmission signal by modulating the main carrier with the modulated subcarrier.

12. An IC card processor according to claim 9, wherein the transmitted data sequence is formed of a plurality of data sequences, and
    wherein said modulation circuit multiplexes the plurality of data sequences and thereafter forms the transmission signal.

13. An IC card processor according to claim 12, wherein said modulation circuit forms the transmission signal by frequency-multiplexing the plurality of data sequences.

14. An IC card processor according to claim 9, wherein the transmitted data sequence is coded by a coding method of suppressing a lower band.

15. An IC card processor according to claim 9, wherein said modulation circuit forms the transmission signal so that the electric power of the main carrier is 99% or more of the total electric power.

16. An IC card processor according to claim 9, wherein the modulation circuit forms the transmission signal by a depth of modulation smaller than 1.

17. An IC card system in which desired data sequences are transmitted and received in a non-contact manner between an IC card and an IC card processor, said IC card comprising:

an antenna for receiving a transmission signal from the IC card processor;

a demodulation circuit for retrieving a transmitted data sequence sent from said IC card processor by demodulating the transmission signal received by said antenna; and a modulation circuit for forming a response signal by modulating a main carrier having the same frequency as a main carrier of the transmission signal with a response data sequence corresponding to the transmitted data sequence in such a manner that a sideband does not overlap a sideband of the transmission signal along the frequency axis, the modulation circuit sending out the response signal from said antenna, said IC card processor comprising:

a demodulation circuit for retrieving the response data sequence sent from the IC card by demodulating the response signal sent from the IC card by wireless communication; and a modulation circuit for forming the transmission signal by modulating the main carrier with the transmitted data sequence, said modulation circuit sending out the transmission signal from a predetermined antenna.

* * * * *